United States Patent [19]
Fergason

[11] Patent Number: 5,347,383
[45] Date of Patent: Sep. 13, 1994

[54] HIGH SPEED, LOW POWER DRIVING CIRCUIT FOR LIQUID CRYSTAL SHUTTER

[75] Inventor: John D. Fergason, Sunnyvale, Calif.

[73] Assignee: OSD Envizion Company, Menlo Park, Calif.

[21] Appl. No.: 943,994

[22] Filed: Sep. 11, 1992

Related U.S. Application Data

[63] Continuation of Ser. No. 365,167, Jun. 12, 1989, abandoned.

[51] Int. Cl.⁵ .............................................. G02F 1/13
[52] U.S. Cl. ........................................ 359/85; 359/84; 320/14
[58] Field of Search ................. 350/332; 359/85, 84; 320/1, 14, 21, 39; 340/784

[56] References Cited

U.S. PATENT DOCUMENTS

| | | | |
|---|---|---|---|
| Re. 29,684 | 6/1978 | Gordon | 219/147 |
| Re. 32,521 | 10/1987 | Fergason | 292/245 |
| 3,137,784 | 6/1964 | Kasemann | 219/147 |
| 3,245,315 | 4/1966 | Marks et al. | 359/254 |
| 3,731,986 | 5/1973 | Fergason | 359/85 |
| 3,881,808 | 5/1975 | Gurtler et al. | 359/40 |
| 3,890,628 | 6/1975 | Gurtler | 354/227.1 |
| 3,918,796 | 11/1975 | Fergason | 359/43 |
| 3,967,881 | 6/1976 | Katano et al. | 359/53 |
| 4,039,254 | 8/1977 | Harsch | 359/53 |
| 4,071,912 | 2/1978 | Budmiger | 359/66 |
| 4,240,709 | 12/1980 | Hörnell | 359/352 |
| 4,328,493 | 5/1982 | Shanks et al. | 359/85 |
| 4,385,806 | 5/1983 | Fergason | 350/347 R |
| 4,436,376 | 3/1984 | Fergason | 350/334 |
| 4,540,243 | 9/1985 | Fergason | 359/156 |
| 4,556,289 | 12/1985 | Fergason | 359/52 |
| 4,710,694 | 12/1987 | Sutphin et al. | 320/21 |
| 4,728,173 | 3/1988 | Toth | 359/53 |
| 4,759,608 | 7/1988 | Yang | 350/332 |
| 4,863,244 | 9/1989 | Fuerthbauer et al. | 350/332 |
| 5,015,086 | 5/1991 | Okaue et al. | 351/44 |

FOREIGN PATENT DOCUMENTS

| | | |
|---|---|---|
| 0157744 | 9/1985 | European Pat. Off. |
| 5592276 | 7/1980 | Japan |
| 7608690-9 | 2/1979 | Sweden |

*Primary Examiner*—Sara W. Crane
*Attorney, Agent, or Firm*—Renner, Otto, Boisselle & Sklar

[57] ABSTRACT

A driving circuit for a liquid crystal shutter or for other devices that reduces the power drain on the portable power supply and has the characteristic of fast response time. Accurate voltage regulation also is provided by referencing an accurate reference voltage supplied by a diode.

37 Claims, 2 Drawing Sheets

HIGH SPEED, LOW POWER DRIVING CIRCUIT FOR LIQUID CRYSTAL SHUTTER

This is a continuation of copending application(s) Ser. No. 07/365,167 filed on Jun. 12, 1989 now abandoned.

TECHNICAL FIELD

The present invention relates generally, as indicated, to driving circuits for liquid crystal shutters and, more particularly, to a high speed, low power driving circuit for a liquid crystal shutter operable to control transmission of light therethrough.

BACKGROUND

The present invention is described below with respect to a liquid crystal shutter. It will be appreciated, though, that features of the invention may be utilized with shutters formed of materials other than liquid crystal and also may be utilized with devices other than shutters. A shutter as used herein refers to a device for controlling the transmission of electromagnetic energy or electromagnetic radiation, for example, being transmitted or not through the shutter. In the preferred embodiment described in detail below, such electromagnetic energy is in the form of light and more preferably is in the form of electromagnetic energy that is in the visible spectrum as well as in the various infrared spectra and ultraviolet spectra.

An exemplary liquid crystal shutter with which the driving circuit of the invention may be utilized is disclosed in U.S. Pat. Nos. 4,385,806, 4,436,376, 4,540,243, and Re. 32,521. An example of such shutter includes a pair of linear polarizers, one being used as an input polarizer and the other as an output analyzer, and a variable liquid crystal optical retarder between the two polarizers. By changing the electric field applied to liquid crystal in the retarder, the plane of polarization of the light transmitted through the retarder can be changed; and the intensity of light transmitted through the analyzer will be a function of the polarization direction of the light transmitted through the retarder.

One approach to providing for high speed operation, for example, in the microsecond range, say from several microseconds to several tens of microseconds, for such optical shutter, operation is according to surface mode effect, whereby that liquid crystal material located near the center of the liquid crystal cell along the optical transmission direction through the cell is maintained in a preferred alignment during cell operation, whereas liquid crystal material nearer the respective surfaces of the cell, i.e., the interface between the liquid crystal material and the respective glass plates, is switched as a function of the applied electric field, as is described in detail in the above-mentioned patents. In one embodiment some means, such as a bias voltage or electric field, or some other means or mechanism, is used to obtain the preferred alignment of liquid crystal material near the center of the cell. Application of a larger voltage/electric field compared to the exemplary bias voltage/electric field, effects switching of the alignment of the liquid crystal material nearer the surfaces.

The exemplary shutter may be used in a variety of embodiments and applications. One example is as a lens or shutter for a welding helmet. The shutter may be used to increase or to decrease the amount of light transmitted through the shutter. Therefore, when welding is not occurring, the shutter may be substantially optically transmissive. When welding is occurring, the shutter may be closed to minimize the amount of light transmitted therethrough in order to protect the eyes of the person performing the welding. A photosensitive device may be used to sense the intensity of light impinging in the area of the shutter so as to provide an input to a drive circuit for the shutter in order to control opening and closing thereof.

A problem experienced in the past has been the time required for a drive circuit to energize a variable liquid crystal retarder in the above-described shutter. Using such shutters in a welding helmet and in other environments where there is not a convenient access to a power supply connection directly to a utility company, battery power ordinarily must be used to drive the shutter. The problem encountered with prior driving circuits for such shutters has been the power drain on the battery or other portable power supply.

BRIEF SUMMARY OF THE INVENTION

The present invention provides a driving circuit for a liquid crystal shutter or for other devices that reduces the power drain on the portable power supply. The invention also has the characteristic of fast response time.

According to one aspect of the invention, a power supply for a liquid crystal shutter includes input means for providing an input representative of an optical characteristic of such shutter, output means for supplying an electrical driving signal to such shutter to cause such optical characteristic thereof, power circuit means for selectively supplying to such output means a drive signal of selected power as a function of the input from the input means, and AC control signal means for supplying an AC driving control signal to the output means to deliver such drive signal according to the characteristics of such AC driving control signal.

According to another aspect, a liquid crystal optical shutter apparatus includes a liquid crystal shutter means for producing a prescribed optical characteristic as a function of a prescribed input thereto, and a power supply for driving the liquid crystal shutter means, the power supply comprising input means for providing an input representative of an optical characteristic of the shutter means, output means for supplying an electrical driving signal to the shutter means to cause such optical characteristic thereof, power circuit means for selectively supplying to such output means a drive signal of selected power as a function of the input from the input means, and AC control signal means for supplying an AC driving control signal to the output means to deliver such drive signal according to the characteristics of such AC driving control signal.

According to another aspect, a power supply circuit for selectively charging a storage device from a power source includes a free running circuit means for developing an oscillatory signal, a power means for responding to such free running circuit means to charge such storage device from such power means, and a comparator means for comparing a first signal representative of the voltage level of such storage device with a reference signal and preventing operation of such power means to charge such storage device when adequate charge is contained in such storage device.

Various other features of the invention, as are described herein, may be employed in optical shutters.

The foregoing and other objects, features, aspects and advantages of the present invention will become more apparent as the following description proceeds. It will be appreciated that while a preferred embodiment of the invention is described herein, the scope of the invention is to be determined by the claims and equivalents thereof. To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

DESCRIPTION OF THE PREFERRED EMBODIMENT

Figure 1:
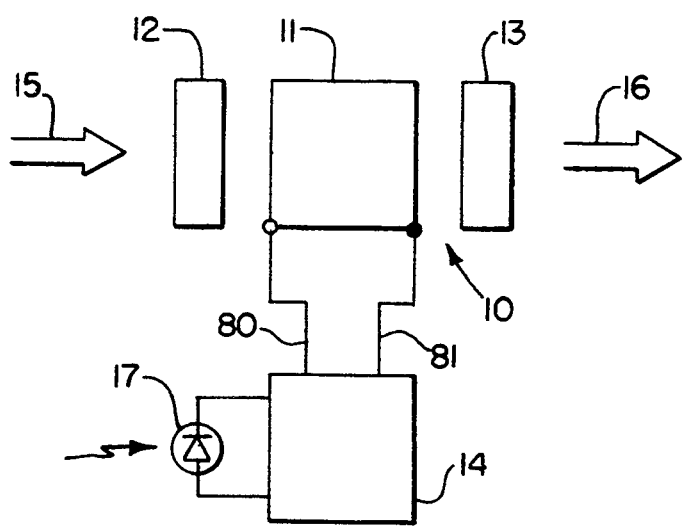
FIG. 1 is a schematic illustration of a liquid crystal optical shutter with a high speed, low power driving circuit therefor in accordance with the present invention.

Referring in detail to the drawings, wherein like reference numerals designate like parts in the several figures, and initially to FIG. 1, a liquid crystal shutter 10 includes a variable optical retarder 11 sandwiched between a pair of linear polarizers 12, 13. The optical axes of the polarizers 12, 13 may be at right angles to each other and at 45 degrees to the optical axis of the retarder 11. The retarder 11 may be of the type disclosed in the above-mentioned patents.

A power supply 14 may be operated to provide an electric field of prescribed voltage to the retarder 11 to determine how much of the input light 15 is transmitted as output light 16 by the shutter 10. A photosensitive detector 17, for example, in the form of a photosensitive diode (although other photosensors may be used), preferably automatically detects the intensity of the incident light 15 and provides a control input to the power supply 14 thereby to provide for automatic operation of the shutter 11. Accordingly, in response to a relatively low intensity input of light 15, substantially all of the light possible will be transmitted by the shutter 10 as output light 16. It will be appreciated that since polarizers are used, it is likely that approximately 50% of the incident light 15 will be blocked by such polarizers, as is well known. On the other hand, when the intensity of the incident light 15 exceeds a predetermined value, for example, as the high intensity electromagnetic radiation emitted during the course of welding, the photosensor 17 will detect the same and will cause the driving circuit 14 to operate the shutter 10 to reduce substantially the relative intensity of the output light 16, i.e., relative to the intensity of the incident light 15.

Figure 2:
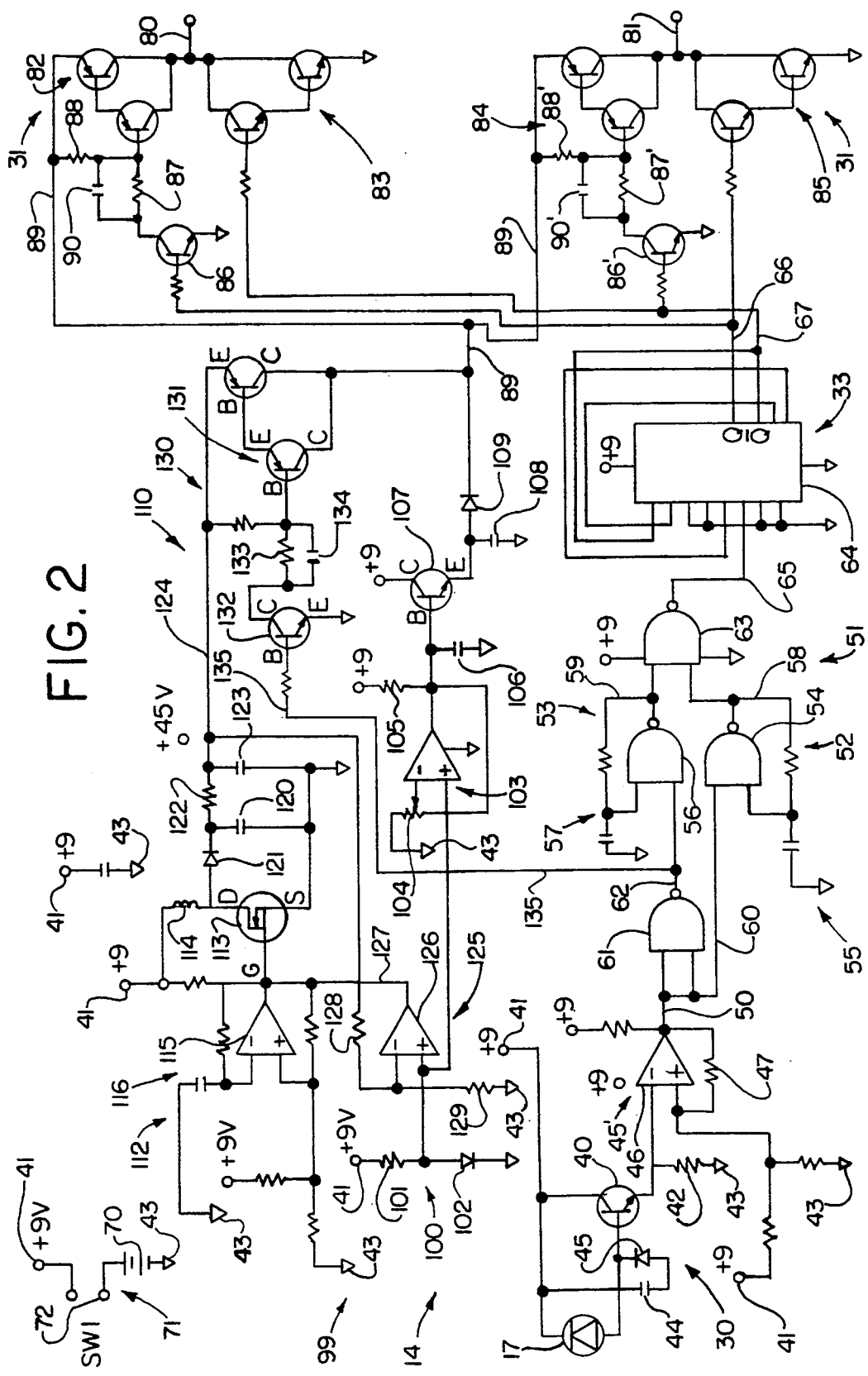
FIG. 2 is a schematic electric circuit diagram of a high speed, low power driving circuit used with the liquid crystal shutter of FIG. 1.

Referring to FIG. 2, details of the driving circuit 14 are illustrated. The driving circuit 14 includes an input circuit 30, an output circuit 31, the power circuit 32, and an AC control circuit 33. Referring to the input circuit 30, a photosensitive diode 17 (or other device that is sensitive to input electromagnetic radiation, for example, light in the visible spectrum) provides an electrical output that is amplified by a transistor amplifier 40, which is coupled between a $V_{cc}$ power terminal 41 (for example, at nine volts) and via a resistor 42 to a source of ground reference potential 43. A start-up circuit including a capacitor 44 and diode 45 is coupled across the photosensor 17. The purpose of the start-up circuit is to provide a short circuiting of the photosensor 17 when first turning on the circuit 14 until the capacitor 44 charges. Such short circuiting provides a maximum output by the transistor amplifier 40 to force the shutter 11 to a maximum powered condition simulating a maximum optical input to the photosensor 17. Such maximum input to the retarder 11 assures that the liquid crystal is properly aligned causing the lens in which the shutter 10 is included to be dark. The time required for the capacitor 44 to charge to a steady-state condition and, therefore, to effectively become an open circuit freeing the photosensor 17 to operate in its intended manner is adequate to achieve the desired initial alignment orientation of the liquid crystal material in the retarder 11. This occurs only when the circuit 14 initially is powered up.

The input circuit 30 also includes a comparator 45' in the form of an operational amplifier 46, feedback resistor 47, and various other connections illustrated in the drawings. The comparator 45' responds to the amplitude of the signal produced by the photosensor 17 as amplified by the transistor amplifier 40 to indicate at NODE 50 an output representing whether or not the shutter is to be open or closed. The comparator 45', therefore, determines whether the output from the transistor amplifier 40, which is provided to the inverting input exceeds the signal provided to the non-inverting input of the operational amplifier 46. A signal at NODE 50 will be on or off, i.e., a logic 1 or a logic 0 signal. Resistor 47 provides hysteresis causing the comparator 45' to function analogous to a Schmitt trigger circuit in order to avoid flicker. The resistor 47, therefore, causes the high to low threshold of the comparator 45 to be different from the low to high threshold.

The output 50 from the comparator 45' is coupled to a dual frequency oscillator circuit 51. The oscillator circuit includes a pair of conventional oscillators 52, 53. The oscillator 52 includes a NAND gate 54 and an RC circuit 55; and the oscillator 53 includes a NAND gate 56 and an RC circuit 57. The resistance and capacitance of the components used in the RC circuits 55, 57 are selected so that the oscillator 52 provides a relatively high frequency signal at the output 58, and the oscillator 53 provides a relatively low frequency signal at the output 59 thereof.

The oscillator 52 is coupled by line 60 directly to NODE 50. When the comparator 45 produces a high signal at NODE 50, the high frequency oscillator 52 turns on to produce a high frequency signal at its output 58. When the comparator 45 is producing a relatively low signal, a dual input NAND gate 61 produces on line 62 a relatively high signal that turns on the low frequency oscillator 53, which provides a relatively low frequency AC signal at its output 59; while the low signal at NODE 50 maintains the high frequency oscillator 52 off.

From the foregoing, then, it will be appreciated that depending on the intensity of the incident light 15 on the photosensor 17, one of the respective high or low frequency oscillators 52, 53 will turn on. The AC oscillatory signal produced by the respective oscillator is coupled by a further NAND gate 63 as an input to an integrated circuit 64, such as an IC No. 14013, which is coupled as a flip-flop. The flip-flop 64 converts the signal received on line 65 from the NAND gate 63, which is not a symmetrical square wave signal, to a symmetrical square wave signal that is produced at the inverting and non-inverting outputs 66, 67 of the integrated circuit forming the flip-flop 64. The square wave produced on the outputs 66, 67 are out of phase by 180 degrees, as is well known. Such square wave signals are provided as AC control inputs to the output circuit 31. Such AC control signal drives the output circuit 31 so that the AC signal is applied to the liquid crystal retarder 11 in order to avoid polarizing the liquid crystal retarder 11.

The flip-flop 64 divides the AC signal received from the NAND gate 63, which has a frequency that is a function of the respective oscillator 52, 53 that is operating, by four to square the signal produced by the flip-flop.

The two different frequency oscillators 52, 53 are used in the driving circuit 14 to optimize efficiency and to minimize drain of the battery 70 in the circuit power supply 71 when the main power switch 72 of the circuit 14 is closed. Specifically, as was mentioned above, desirably the variable liquid crystal retarder 11 is driven either at low voltage when primarily only liquid crystal material near the center of the liquid crystal shutter is aligned by the applied electric field or at a higher voltage when the liquid crystal material nearer the surfaces aligns with respect to the applied electric field. More specifically, when the liquid crystal cell is operated at the low voltage level, the oscillator 52 provides the AC control signal to the output circuit 31 which in turn provides a relatively low voltage electric field to maintain the liquid crystal in the retarder 11 in partially aligned condition at which time the shutter 10 is transmitting a maximum amount of light. To avoid flicker while such maximum amount of light is transmitted, it is desirable to operate the shutter at a relatively high frequency.

On the other hand, when the incident light 15 is at relatively high intensity and the shutter 10 is operating to minimize transmission of light therethrough, flicker is not a problem. Moreover, since the liquid crystal retarder 11 is primarily a capacitive load, the larger the frequency of the signal driving such load, the less efficient is the driving and the more power is wasted. Accordingly, it is desirable, then, to drive the shutter at a relatively low frequency to save power and minimize battery drain.

The output circuit 31 includes a pair of output terminals 80, 81 which are coupled to the respective electrodes (not shown) of the liquid crystal retarder 11. Each of such terminals 80, 81 are, respectively, driven by a pair of Darlington pair transistor amplifiers 82, 83, 84, 85, as is illustrated in FIG. 2. The output line 66 from the flip-flop 64 is coupled to the amplifiers 82, 85; and the output line 67 is coupled to the amplifiers 83, 84. Line 66 is coupled to Darlington pair amplifier 82 via a transistor 86, which in turn is coupled via a resistor 87 to the base input of the amplifier 82 which also is coupled via a resistor 88 to the power bus 89 for the circuit 14. A speed up capacitor 90 is coupled between the collector of the transistor 86 and the base input of the Darlington pair amplifier 82. Such speed up capacitor significantly speeds the response of operation of the Darlington pair amplifier to occurrence of the signal on line 66 by providing extra base current for a short time. The resistor 88 speeds up shutting off of the Darlington pair transistors 82. The line 67 from the flip-flop 64 is similarly coupled to via a transistor 86', and resistors 87', 88' to the base input of the Darlington pair amplifier 84 and to the power bus 89'. A speed up capacitor 90' provides the speed up function described above with respect to capacitor 90.

When a positive signal is on line 66 at the output of flip-flop 64, the Darlington pair amplifier 82 rapidly turns on due to the speed up function of the capacitor 90 and couples the power signal on the power bus 89 to terminal 80, which in turn is coupled to one electrode of the retarder 11. The positive signal on line 66 also is provided to the Darlington pair amplifier 85, which in turn couples the terminal 81 that is coupled to the other electrode of the retarder 11 to ground 43. During the time that a positive signal is on line 66, there is a zero or negative signal on line 67; therefore, the Darlington pair amplifiers 83, 84 effectively are open circuited relative to the terminals 80, 81, the power bus 89, and the system ground 43. Later in time, when a positive signal is applied to line 67 and no or a zero signal is applied to line 66 by the flip-flop 64, the opposite condition occurs: Darlington pair amplifiers 82, 85 are open circuited and Darlington pair amplifiers 84, 85 respectively couple the power bus 89 and the system ground 43 to the terminals 81, 80. Thus, an AC signal will be applied across the liquid crystal cell forming the retarder 11 at a frequency that is a function of which oscillator 52, 53 is driving the flip-flop 64 and at an amplitude that is a function of the voltage on the power bus 89.

The power signal provided on the power bus 89 is developed as follows. A low voltage bias circuit 99 develops the low voltage for the retarder 11 to provide the low voltage bias or bias voltage which is to be delivered by the drive circuit 14 to the liquid crystal retarder 11 when maximum transmission/maximum retardation is desired. At this time the retarder 11 would be expected to rotate the plane of polarization of the light received by it from the polarizer 12 by about ninety degrees so that the analyzer 13 would pass such light.

The low voltage bias circuit 99 includes a reference circuit 100 including a resistor 101 and a diode 102, which are coupled across the Vcc supply 41 and ground 43. In the circuit 99, the voltage drop across the diode 102, for example 0.45 volt, is provided as an input to the non-inverting input of an comparator 103. The input of the comparator 103 is coupled via the wiper arm of a potentiometer 104 to a feedback circuit which includes the resistive portion of the potentiometer 104. The output from the comparator 103 104 is coupled via a resistor 105 to the Vcc power supply 41. Adjustment of the potentiometer 104 determines the magnitude of the of the low voltage bias.

Also in the low voltage bias circuit 99 is a capacitor 106, which smooths the output signal from the comparator 104 103, a current amplifier 107, which is in the form of a transistor coupled in emitter follower manner and operates to amplify the current from the comparator 103, a capacitor 108 to provide further stabilizing function, and a blocking diode 109. The diode 109 allows the low voltage bias signal to be applied to the power bus 89 but blocks the high voltage power signal which is developed in the high voltage power circuit 110, from feeding back into the low voltage bias circuit 99.

The high voltage power circuit 110 includes a self regulating high voltage power supply 111 that includes a 100 kHz. square wave generator circuit 112 that provides a driving input to a power transistor amplifier 113 plus inductor stage 114. The square wave generator 112 includes the various circuit components illustrated, such as a comparator 115, capacitor, resistors, and power connections, which form an oscillator 116. Other types of AC signal generating circuits or free-running circuits may be used. The square wave generator 112 provides an AC signal that drives the power transistor amplifier 113, which in .turn is coupled in series circuit with the Vcc source 41, inductor 114, and ground 43.

A voltage is developed by the inductor 114 and power transistor 113, which may be a MOSFET transistor. As the square wave is delivered to the gate input of the power transistor, the inductor is pulled down to ground potential and then is "let go", whereupon the inductor rapidly shoots up to a specified voltage, such as, for example, fifty volts. The inductor charges the capacitor 120 through diode 121 as a conventional LC circuit; and such capacitor then tends to maintain a voltage level thereon at about forty-five volts. Signal filtering of the RC circuit including the resistor 122 and capacitor 123 is provided; and a filtered forty-five volt signal then is supplied at the output bus 124 of the power circuit 32.

An important power- saving circuit 149 feature of the power supply circuit 14 is employed in the self-regulating power supply 111. Specifically, a comparator 125 is coupled to receive the reference voltage at the diode 102. That reference voltage is compared with the voltage on the output bus 124 of the high voltage circuit 110 by the comparator 125. If the voltage on the output bus 124 is at adequate level, then the output from the comparator 125 on line 127 is provided to the output of the comparator 115 and gate input of the power transistor 113 disabling the oscillator 116 and shutting off the power transistor 113. As a result, the capacitor 120 will not be further charged until the signal on the output bus 124 drops below a prescribed value, which is determined by the ratio of the resistors 128, 129, so that the comparator no longer disables the oscillator 116. The oscillator 116 then runs to provide driving input to the power transistor 113 which again causes charging of the capacitor 120. Accordingly, the power saving circuit 149 prevents charging of the capacitor 120 unless such charging is required. This helps minimize unnecessary wasting or draining of the battery 70 or other power source for the circuit 14.

The constant voltage provided by the reference diode 102, then, is used as the reference against which the self regulating power supply 111 is compared and which accordingly determines the desired regulated voltage. More specifically, even as the battery 70 voltage may vary, the very stable voltage provided by the reference diode 102 helps assure good regulation and a constant output voltage on the output bus 124 by the circuit 110, as stored on the capacitor 120, for example.

A switching circuit 130 is provided in the high voltage circuit 110 to turn on or off the high voltage signal with respect to transmission thereof to the power bus 89. Such switching circuit 130 includes a Darlington pair transistor amplifier 131, which is triggered by transistor 132 that is coupled in an emitter follower configuration. The transistor amplifier 132 is coupled to the base input of the amplifier 131 via resistor 133 and capacitor 134, which also provides speed up function, as was described above. Therefore, when high voltage is needed, it is provided rapidly. To drive the switching circuit 130, line 135 is coupled from the output of the NAND gate 61. In particular, when such NAND gate is providing a high output to cause the low frequency oscillator 53 to turn on, the transistor 132 turns on to turn on the Darlington pair amplifier 131. The forty-five volt signal then is delivered from the output bus 124 to the power bus 89.

In operation of the circuit 14, then, when maximum retardation is required by the retarder 11 to maximize light transmission through the shutter 10, minimum light will impinge on the photosensor 17. Therefore, the high frequency oscillator 52 will provide AC driving signals to the output circuit 31, and the lack of signal on line 135 will cause the switching circuit 130 to block delivery of the high voltage to the power bus 89; instead, the low voltage bias signal will be applied to the power bus via diode 109. When minimum retardation is desired, high voltage is required to be delivered to the power bus 89 and .from there to the shutter 10. In this case a large intensity light impinges on the photosensor 17, which causes the low frequency oscillator 53 to be energized to drive the output circuit 31 and which causes a positive signal on line 135 to turn on switching circuit 130 to provide the high voltage from capacitor 120 to power bus 89.

STATEMENT OF INDUSTRIAL APPLICATION

From the foregoing, then, it will be appreciated that the invention provides for selective energization of a liquid crystal retarder for use in a liquid crystal shutter or like device as a function of the incident light to such shutter.

I claim:

1. A power supply for a liquid crystal shutter, comprising input means for providing an input representative of an optical characteristic of such shutter, output means for supplying an electrical driving signal to such shutter to cause such optical characteristic thereof, power circuit means for selectively supplying to such output means a drive signal of selected power as a function of the input from said input means, and AC control signal means for selectively supplying an AC driving control signal at a frequency selected between two or more different, non-zero frequencies as a function of the input from said input means, to said output means to deliver such electrical driving signal according to the characteristics of such AC driving control signal.

2. The power supply of claim 1, said power circuit means comprising means for supplying both relatively high and relatively low amplitude drive signals.

3. The power supply of claim 2, said power circuit means comprising switch means for providing such relatively high amplitude power signal in response to such input representative of a desired characteristic of such shutter.

4. A power supply for a liquid crystal shutter, comprising input means for providing an input representative of an optical characteristic of such shutter, output means for supplying an electrical driving signal to such shutter to cause such optical characteristic thereof, power circuit means for selectively supplying to such output means a drive signal of selected power as a function of the input from said input means, AC control signal means for supplying an AC driving control signal to said output means to deliver such drive signal according to the characteristics of such AC driving control signal, and said power circuit means including a transistor amplifier, and further comprising speed up means coupled to said transistor amplifier to speed the operative response thereof.

5. The power supply of claim 4, said transistor amplifier comprising a drive transistor and an output transistor, and said speed up means comprising a speed up capacitor coupled between said drive and output transistors.

6. The power supply of claim 5, wherein said transistor amplifier comprises a second output transistor, and said output transistors are configured as a Darlington pair.

7. The power supply of claim 1, said input means comprising a photosensitive diode.

8. A power supply for a liquid crystal shutter, comprising input means for providing an input representative of an optical characteristic of such shutter, output means for supplying an electrical driving signal to such shutter to cause such optical characteristic thereof, power circuit means for selectively supplying to such output means a drive signal of selected power as a function of the input from said input means, AC control signal means for supplying an AC driving control signal to said output means to deliver such drive signal according to the characteristics of such AC driving control signal, and said input means comprising oscillator means for producing AC signals at two different frequencies as a function of the amplitude of the desired characteristic of such shutter.

9. The power supply of claim 8, wherein such shutter is a liquid crystal shutter presenting a capacitive load to such output means, and said oscillator means comprises means for providing a relatively low frequency output to cause a relatively low frequency driving signal to such liquid crystal shutter at relatively high power and a relatively higher frequency drive signal to such liquid crystal shutter at relatively low power to achieve a prescribed operational characteristic of such liquid crystal shutter.

10. A liquid crystal optical shutter apparatus, comprising a liquid crystal shutter means for producing a prescribed optical characteristic as a function of a prescribed input thereto, and a power supply for driving said liquid crystal shutter means, said power supply comprising input means for providing an input representative of an optical characteristic of said shutter means, output means for supplying an electrical driving signal to said shutter means to cause such optical characteristic thereof, power circuit means for selectively supplying to such output means a drive signal of selected power as a function of the input from said input means, and AC control signal means for selectively supplying an AC driving control signal at a frequency selected between two or more different, non-zero frequencies as a function of the input from said input means, to said output means to deliver such electrical driving signal according to the characteristics of such AC driving control signal.

11. The shutter of claim 10, said power circuit means including a transistor amplifier, and further comprising speed up means coupled to said transistor amplifier to speed the operative response thereof.

12. A liquid crystal optical shutter apparatus, comprising a liquid crystal shutter means for producing a prescribed optical characteristic as a function of a prescribed input thereto, and a power supply for driving said liquid crystal shutter means, said power supply comprising input means for providing an input representative of an optical characteristic of said shutter means, output means for supplying an electrical driving signal to said shutter means to cause such optical characteristic thereof, power circuit means for selectively supplying to such output means a drive signal of selected power as a function of the input from said input means, and AC control signal means for supplying an AC driving control signal to said output means to deliver such drive signal according to the characteristics of such AC driving control signal, and said input means comprising oscillator means for producing AC signals at two different frequencies as a function of the amplitude of the desired characteristic of said shutter means.

13. The shutter of claim 12, wherein said shutter means is a liquid crystal shutter presenting a capacitive load to such output means, and said oscillator means comprises means for providing a relatively low frequency output to cause a relatively low frequency drive signal to said liquid crystal shutter at relatively high power and a relatively higher frequency drive signal to such liquid crystal shutter at relatively low power to achieve a prescribed operational characteristic of said liquid crystal shutter.

14. The power supply of claim 10, said input means comprising a photosensitive diode.

15. A power supply circuit for selectively charging a storage device from a power source, comprising a free running circuit means for developing an oscillatory signal, a power means for responding to such free running circuit means to charge such storage device from such power means, and a comparator means for comparing a first signal representative of the voltage level of such storage device with a reference signal and preventing operation of said power means to charge such storage device when adequate charge is contained in such storage device.

16. The circuit of claim 15, wherein said comparator is operative to maintain a substantially constant charge on such storage device even with a variable input voltage from such power source.

17. The circuit of claim 16, further comprising a diode means for providing such reference signal.

18. The power supply of claim 1, wherein the frequency of said AC driving control signal remains non-zero during operation.

19. A power supply for a liquid crystal shutter, comprising:

input means for providing an input signal representative of a desired optical characteristic of such shutter, output means for supplying an electrical driving signal to such shutter to cause such optical characteristic thereof, power circuit means for selectively supplying to such output means a power signal of selected power as a function of the input signal from said input means, AC control signal means for selectively supplying to said output means an AC control signal of selected frequency as a function of the input signal from said input means; and wherein said output means delivers such electrical driving signal according to the characteristics of such power signal and such AC control signal, and wherein at least one of the magnitude and frequency of such electrical driving signal remains non-zero during operation.

20. The power supply of claim 19, wherein the magnitude of said electrical driving signal remains non-zero.

21. The power supply of claim 20, wherein the frequency of said electrical driving signal remains non-zero.

22. The power supply of claim 1, wherein said input means comprises a photosensitive sensor which provides a signal representative of the intensity of light in the area of said shutter.

23. The power supply of claim 1, wherein said input means comprises a photosensitive sensor that detects the intensity of light emitted from a welding arc.

24. The power supply of claim 1, said input means comprising a detector for detecting an input thereto, and wherein a characteristic of such input represents a desired light transmitting characteristic of such shutter.

25. The power supply of claim 1, said power circuit means comprising a circuit for selectively charging a storage device from a power source, including a free running circuit means for developing an oscillatory signal, a power means for responding to such free running circuit means to charge such storage device from such power means, and a comparator means for comparing a first signal representative of the voltage level of such storage device with a reference signal and preventing operation of said power means to charge such storage device when adequate charge is contained in such storage device.

26. The apparatus of claim 10, wherein said input means comprises a photosensitive sensor which provides a signal representative of the intensity of light in the area of said shutter.

27. The apparatus of claim 10, wherein said input means comprises a photosensitive sensor that detects the intensity of light emitted from a welding arc.

28. The apparatus of claim 10, said input means comprising a detector for detecting an input thereto, and wherein a characteristic of such input represents a desired light transmitting characteristic of such shutter.

29. The apparatus of claim 10, said power circuit means comprising a circuit for selectively charging a storage device from a power source, including a free running circuit means for developing an oscillatory signal, a power means for responding to such free running circuit means to charge such storage device from such power means, and a comparator means for comparing a first signal representative of the voltage level of such storage device with a reference signal and preventing operation of said power means to charge such storage device when adequate charge is contained in such storage device.

30. The apparatus of claim 10, wherein said liquid crystal shutter means is operative to produce an optical characteristic as different conditions of optical transmission as a function of the input thereto.

31. The apparatus of claim 12, wherein said liquid crystal shutter means is operative to produce an optical characteristic as different conditions of optical transmission as a function of the input thereto.

32. The circuit of claim 15, wherein said power means comprises a power transistor.

33. The circuit of claim 32, wherein said power means further comprises an inductor connected in series with said power transistor.

34. The power supply of claim 19, wherein said input means comprises a photosensitive sensor which detects the intensity of light in the area of said shutter.

35. The power supply of claim 19, wherein said input means comprises a photosensitive sensor that detects the intensity of light emitted from a welding arc.

36. The power supply of claim 19, said input means comprising a detector for detecting an input thereto, and wherein a characteristic of such input represents a desired light transmitting characteristic of such shutter.

37. The power supply of claim 19, said power circuit means comprising a circuit for selectively charging a storage device from a power source, including a free running circuit means for developing an oscillatory signal, a power means for responding to such free running circuit means to charge such storage device from such power means, and a comparator means for comparing a first signal representative of the voltage level of such storage device with a reference signal and preventing operation of said power means to charge such storage device when adequate charge is contained in such storage device.

* * * * *